United States Patent
Pettey et al.

(10) Patent No.: US 11,994,171 B2
(45) Date of Patent: May 28, 2024

(54) CLAMPING SHAFT COUPLER

(71) Applicant: ROBOTZONE, LLC, Winfield, KS (US)

(72) Inventors: Brian T. Pettey, Winfield, KS (US); Kyle R. Lewis, Winfield, KS (US); Jason J. Jaeger, Winfield, KS (US)

(73) Assignee: Robotzone, LLC, Winfield, KS (US)

( * ) Notice: Subject to any disclaimer, the term of this patent is extended or adjusted under 35 U.S.C. 154(b) by 672 days.

(21) Appl. No.: 16/156,431

(22) Filed: Oct. 10, 2018

(65) Prior Publication Data
US 2020/0116182 A1 Apr. 16, 2020

(51) Int. Cl.
F16D 1/08 (2006.01)
F16B 2/06 (2006.01)

(52) U.S. Cl.
CPC ............ F16D 1/0864 (2013.01); F16B 2/065 (2013.01)

(58) Field of Classification Search
CPC ...... F16B 2/065; F16D 1/0847; F16D 1/0864; F16D 1/087; F16D 2001/102; Y10T 403/3953; Y10T 403/53; Y10T 403/535; Y10T 403/69; Y10T 403/7069
USPC ...................... 403/195, 289, 290, 344, 374.3
See application file for complete search history.

(56) References Cited

U.S. PATENT DOCUMENTS

| | | |
|---|---|---|
| 1,166,688 A | 1/1916 | Hornby |
| 1,763,302 A | 6/1930 | Gilbert |
| 1,789,896 A | 1/1931 | Gilbert |
| 1,792,976 A | 2/1931 | Gilbert |
| 2,082,138 A | 6/1937 | Badel |
| 2,095,700 A | 10/1937 | Heede |
| 2,124,748 A | 7/1938 | Ransom, Jr. |
| 2,269,821 A | 1/1942 | Kemphert et al. |
| 2,306,876 A | 12/1942 | Frank |
| 2,466,097 A | 4/1949 | Graue |
| 2,804,322 A | 8/1957 | Herzog |
| 2,933,934 A | 4/1960 | Haroldson |
| 3,355,837 A | 12/1967 | Pedersen |
| 3,598,432 A | 8/1971 | Walker |
| 3,708,243 A | 1/1973 | Wooden |

(Continued)

FOREIGN PATENT DOCUMENTS

| | | |
|---|---|---|
| DE | 102010005073 A1 | 7/2011 |
| DE | 102013007767 A1 | 11/2014 |

OTHER PUBLICATIONS https://www.superdroidrobots.com/shop/item.aspx/steel-d-shaft-sprocket-for-25-pitch-chain-15-teeth/2209, Apr. 15, 2019, 2 pages.

*Primary Examiner* — Josh Skroupa
(74) *Attorney, Agent, or Firm* — Christopher R. Christenson; Kelly, Holt & Christenson, PPLC

(57) ABSTRACT

A clamping coupler for a hobby servo motor includes a body. The clamping couple also includes a first body portion and a second body portion separated by a gap. The clamping coupler includes an aperture configured to receive a shaft of the hobby servo motor, the aperture defined, at least in part, by the first body portion, second body portion and the gap. The coupler includes a first fastener coupled to the first body portion and the second body portion, that when actuated exerts a first force on the first body towards the second body. The coupler includes a second fastener coupled to the first body portion and the second body portion, that when actuated exerts a second force on the first body towards the second body.

15 Claims, 15 Drawing Sheets

(56) References Cited

U.S. PATENT DOCUMENTS

| | | | | |
|---|---|---|---|---|
| 3,851,983 | A * | 12/1974 | MacKenzie | F16D 1/0864 403/312 |
| 3,917,424 | A * | 11/1975 | Zugel | F16D 1/0864 403/287 |
| 3,937,595 | A | 2/1976 | English et al. | |
| 4,006,993 | A | 2/1977 | Woerlee | |
| 4,067,658 | A | 1/1978 | Ueno et al. | |
| 4,142,811 | A | 3/1979 | Burnham | |
| 4,274,036 | A | 6/1981 | Fukasaku et al. | |
| 4,475,475 | A | 10/1984 | Zylbert | |
| 4,565,464 | A * | 1/1986 | Nilsson | F16D 1/0864 403/290 |
| 4,848,951 | A | 7/1989 | Boogerman | |
| 4,884,824 | A | 12/1989 | Radke | |
| 4,984,931 | A | 1/1991 | Struthers et al. | |
| 5,052,842 | A | 10/1991 | Janatka | |
| 5,062,734 | A | 11/1991 | Vanzee | |
| 5,067,845 | A | 11/1991 | Schlueter | |
| 5,306,096 | A | 4/1994 | Tuns et al. | |
| 5,580,184 | A | 12/1996 | Riccitelli | |
| 5,851,084 | A * | 12/1998 | Nishikawa | F16D 1/0864 403/290 |
| 6,364,720 | B1 | 4/2002 | Liang | |
| 6,390,721 | B1 | 5/2002 | Wilson, II | |
| 6,619,878 | B2 | 9/2003 | Wang et al. | |
| 6,682,432 | B1 | 1/2004 | Shinozauka | |
| 6,905,249 | B2 | 6/2005 | Schill et al. | |
| 7,243,562 | B2 | 7/2007 | Enright | |
| 7,284,457 | B2 | 10/2007 | Jinno et al. | |
| 7,371,027 | B2 * | 5/2008 | Mochizuki | F16L 21/065 403/289 |
| 7,431,531 | B2 | 10/2008 | Carnevali | |
| 7,524,132 | B2 | 4/2009 | Horen et al. | |
| 7,930,826 | B2 | 4/2011 | Inoue et al. | |
| 8,453,987 | B2 | 6/2013 | Pettey | |
| 8,816,553 | B2 | 2/2014 | Pettey | |
| 9,038,621 | B2 | 5/2015 | Cadima | |
| 9,181,985 | B2 * | 11/2015 | Carlson | F16D 1/0864 |
| 9,291,205 | B2 | 3/2016 | Widenmeyer | |
| 9,550,130 | B2 | 1/2017 | Pettey | |
| 9,581,205 | B2 | 2/2017 | Knoth | |
| D827,573 | S | 9/2018 | Pettey | |
| 10,093,505 | B2 * | 10/2018 | Ito | B65H 27/00 |
| 10,125,854 | B2 | 11/2018 | Lingren et al. | |
| 10,215,264 | B2 | 2/2019 | Ungar et al. | |
| 2003/0063948 | A1 * | 4/2003 | Liu | F16D 1/0864 403/344 |
| 2009/0247045 | A1 | 10/2009 | Pettey | |
| 2012/0231892 | A1 * | 9/2012 | Las Navas Garcia | F16D 1/0864 464/61.1 |
| 2015/0016878 | A1 * | 1/2015 | Isaacson | B62D 1/10 403/327 |
| 2015/0354636 | A1 | 12/2015 | Kaneda | |
| 2016/0160929 | A1 | 6/2016 | Janatka | |
| 2018/0112691 | A1 | 4/2018 | Pettey | |
| 2019/0154085 | A1 | 5/2019 | Watanabe | |

* cited by examiner

CLAMPING SHAFT COUPLER

BACKGROUND

Hobby robotics is a growing industry. In this industry, it is common to use various structural and motion components to build a project. Structural components can include channels, extrusions, beams, brackets, blocks, hubs, couplers, etc. Motion components can include stepper or servo motors, linear actuators, shafts, clevises, gears, etc.

SUMMARY

A clamping coupler for a hobby servo motor includes a body. The clamping coupler also includes a first body portion and a second body portion separated by a gap. The clamping coupler includes an aperture configured to receive a shaft of the hobby servo motor, the aperture defined, at least in part, by the first body portion, second body portion and the gap. The coupler includes a first fastener coupled to the first body portion and the second body portion, that when actuated exerts a first force on the first body towards the second body. The coupler includes a second fastener coupled to the first body portion and the second body portion, that when actuated exerts a second force on the first body towards the second body.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION OF ILLUSTRATIVE EMBODIMENTS

In the field of robotics industry, it is common to use various structural and motion components to build a project. Structural components can include channels, extrusions, beams, brackets, blocks, hubs, couplers, etc. Motion components can include stepper or servo motors, linear actuators, shafts, clevises, gears, etc. There are a variety of different ways to secure structure components to motion components. This disclosure relates to a coupler used to couple motion and or structural components to one another.

Some couplers include a set screw that couples to an index on a shaft (e.g., the flat portion of a D-shaped shaft). This set screw may couple the coupler to the shaft, however, when tightening the set screw, it may damage the shaft. To solve the problem of the damage by the set screw, a coupler could clamp around the shaft. However, most clamps are not balanced because they have a clamping fastener on one side. This can cause problems in high speed applications. For instance, the unbalanced part rotating can cause "wobble" which can cause imprecise movement and even damage to the driving motor or shaft. Also most clamping involves some deformation of the coupler. This deformation can cause mounting features (e.g., threaded holes, etc.) to not align properly with accessories. An example coupler in accordance with this disclosure solves all the above-mentioned problems.

Figure 1:
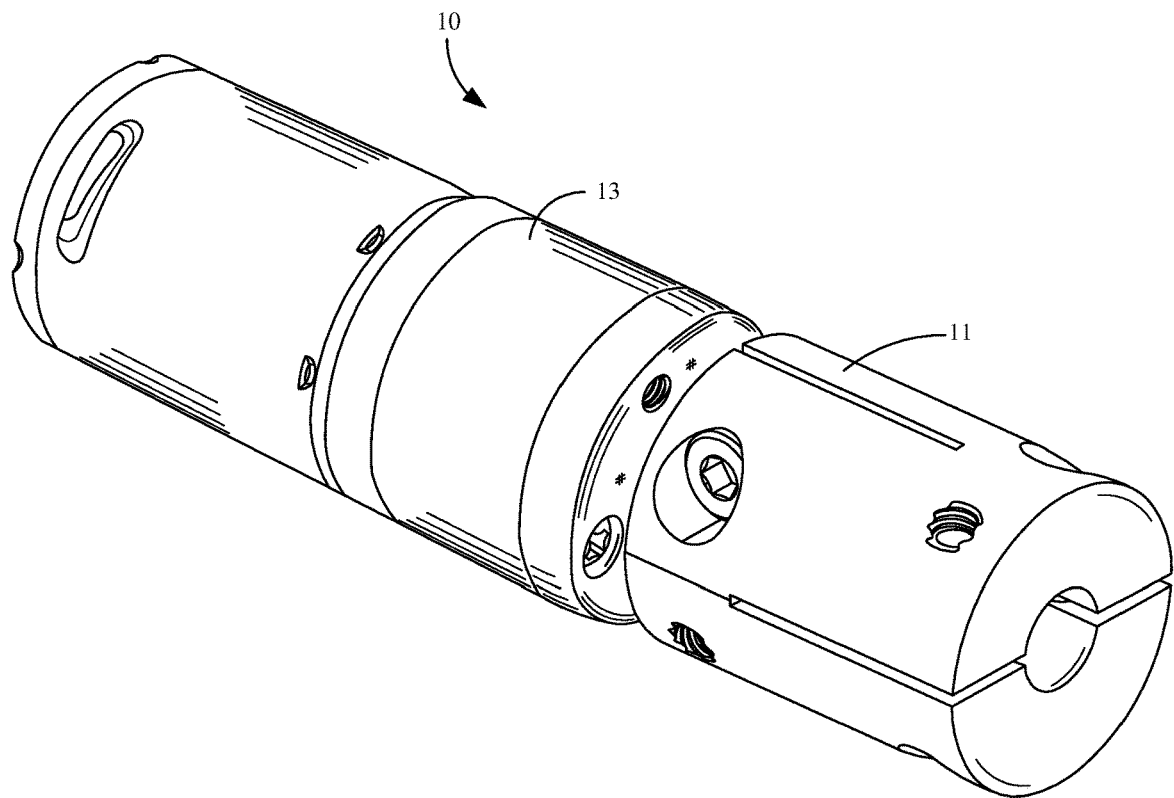
FIG. 1 is a perspective view showing an example motor and coupler assembly.

FIG. 1 is a perspective view showing one example of a motor and coupler assembly 10. Assembly 10 includes motor 13 and coupler 11. As shown, motor 13 is a servo motor. In other examples, motor 13 can be other types of motors as well. Motor 13 drives rotation of output shaft 15. Coupler 11 is coupled to output shaft 15 and when output shaft 15 is driven, coupler 11 is also driven. Coupler 11 includes features that allow for attachments to be coupled to coupler 11. When attachment is coupled to coupler 11 it rotates with coupler 11 and hence when output shaft 15 is driven, coupler 11 and any accessory attached to coupler 11 also are driven.

Figure 2:
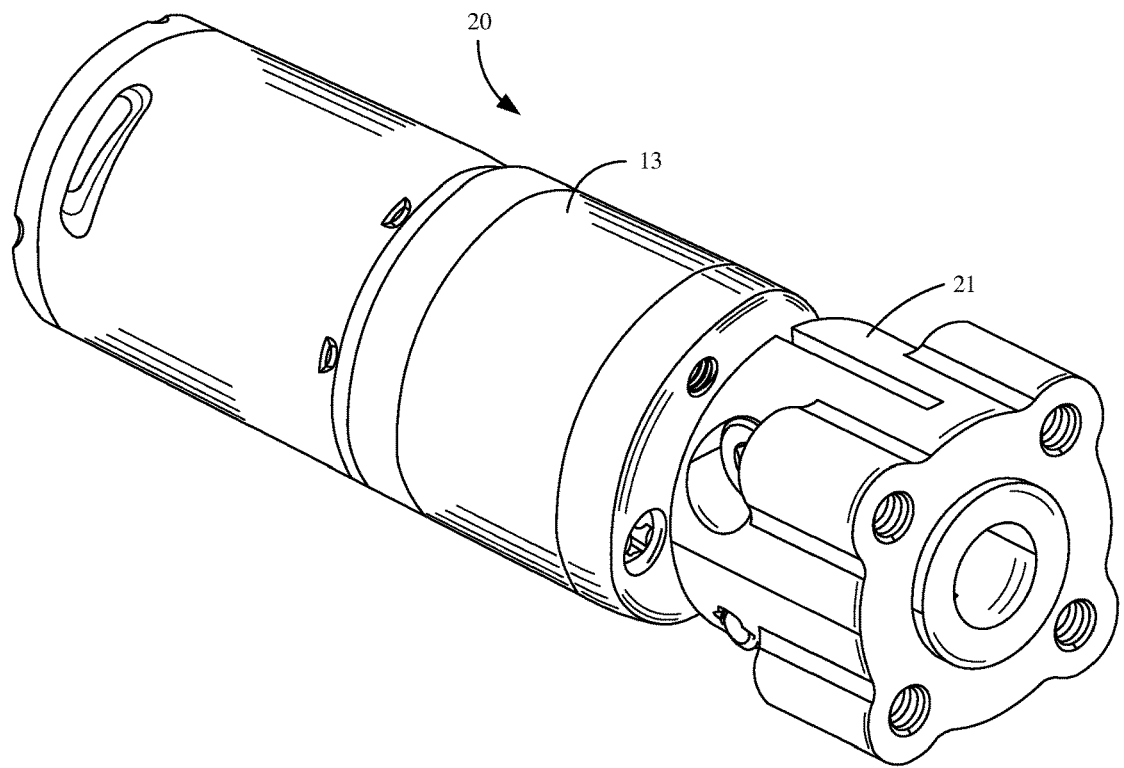
FIG. 2 is a perspective view showing an example motor and coupler assembly.

FIG. 2 is a perspective view showing one example of a motor coupler assembly. Assembly 20 includes motor 13 and coupler 21. As shown motor 13 is a servo motor, however in other embodiments the motor can be a different type motor as well. Motor 13 drives rotation of output shaft 15. Coupler 21 is coupled to output shaft 15 and when output shaft 15 is driven, coupler 21 is also driven. Coupler 21 includes features that allow for attachments to be coupled to coupler 21. When attachment is coupled to coupler 21 it rotates with coupler 21 and hence when output shaft 15 is driven, coupler 21 and any accessory attached to coupler 21 also are driven.

Figure 3A:
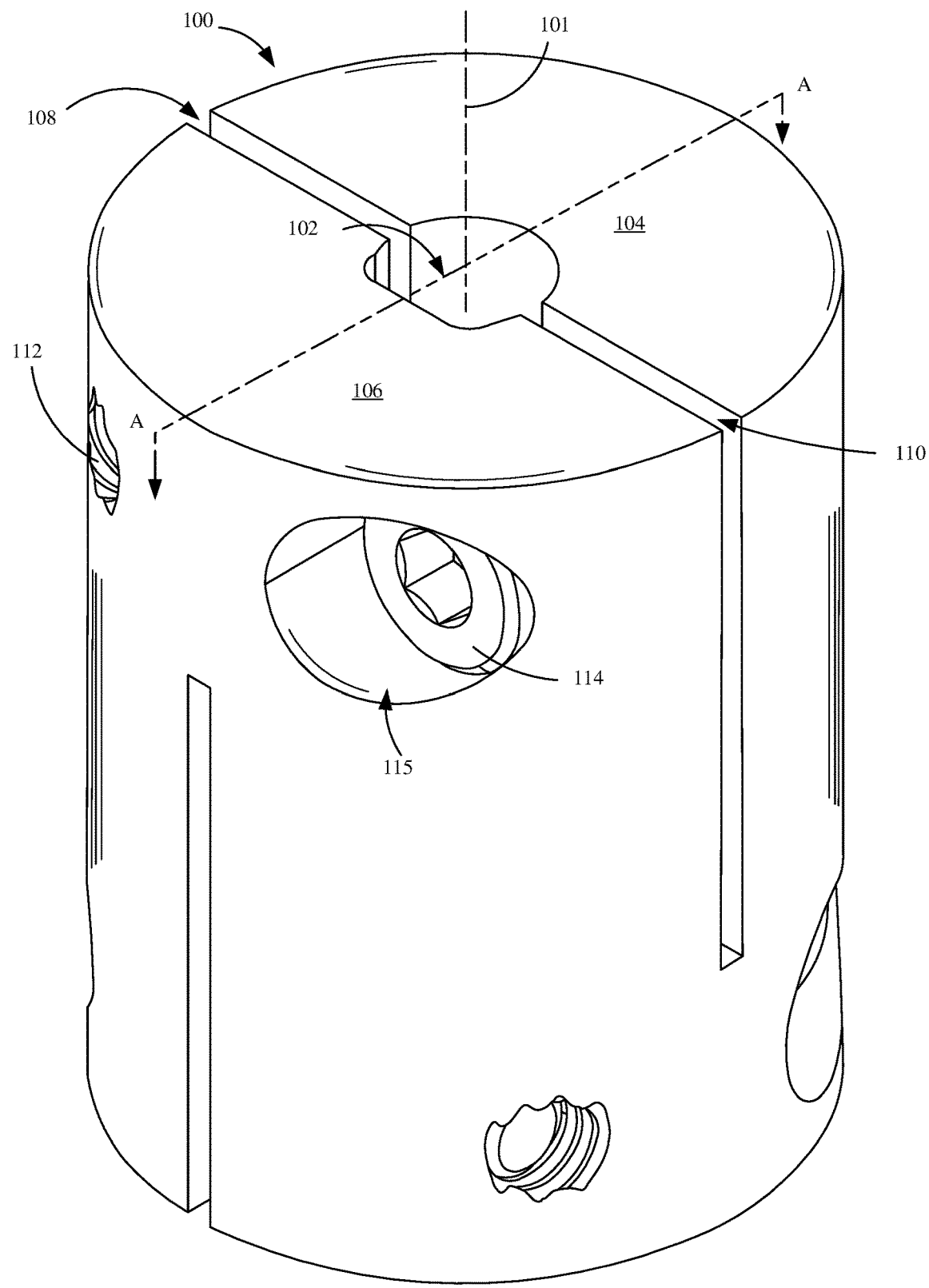
FIG. 3a is a top per perspective view showing an example coupler.

FIG. 3A is a top perspective view showing one example of a coupler 100. Coupler 100 has a shaft aperture 102 that is defined by body portion 104, body portion 106, gap 108 and gap 110. As shown, the shaft aperture 102 is D-shaped. In other examples, shaft aperture 102 can be in another shape as well. For example, hex shaped, circular, various spline configurations, etc.

The cross-sectional area of 102 can be changed by expanding or contracting gaps 108 and 110. Gaps 108 and 110 can be contracted by tightening fasteners 112 and 114 which can bring body portions 104 and 106 closer together. Similarly, loosening fasteners 114 and 112 can sometimes expand gaps 108 and 110. For example, when fasteners 112 and 114 are in a tighten state and loosened, gaps 108 and 110 will expand, to the extent that body portions 104 and 106 return to their initial state because a deforming force applied on them is reduced. The body of coupler 100 can comprise a rigid yet deformable material to all deformation of body portions 104 and 106. For example, the body can comprise aluminum, steel, brass, etc. The width of gaps 108 and 110 can be chosen based in part on the type of material. For example, it may be ideal that the gaps are wide enough to allow a tightening force to be applied on the shaft but not so wide that the body portions will not return to their initial positions after a cycle of tightening and loosening fasteners 112 and/or 114.

As shown fasteners 114 and 112 are arranged in opposing directions. This arrangement allows for better balancing of coupler 100 about center axis 101. Center axis 101 is roughly the axis at which coupler 100 rotates when a driveshaft is inserted into shaft aperture 102. Also, fastener 114 is shown in recess 115. Recess 115 can provide for a reduction in the moment of inertia of coupler 100. Recess 115 can also reduce the risk of fastener in catching on another component during operation. Other fasteners of couplers described below may also be disposed in a recess.

Figure 3B:
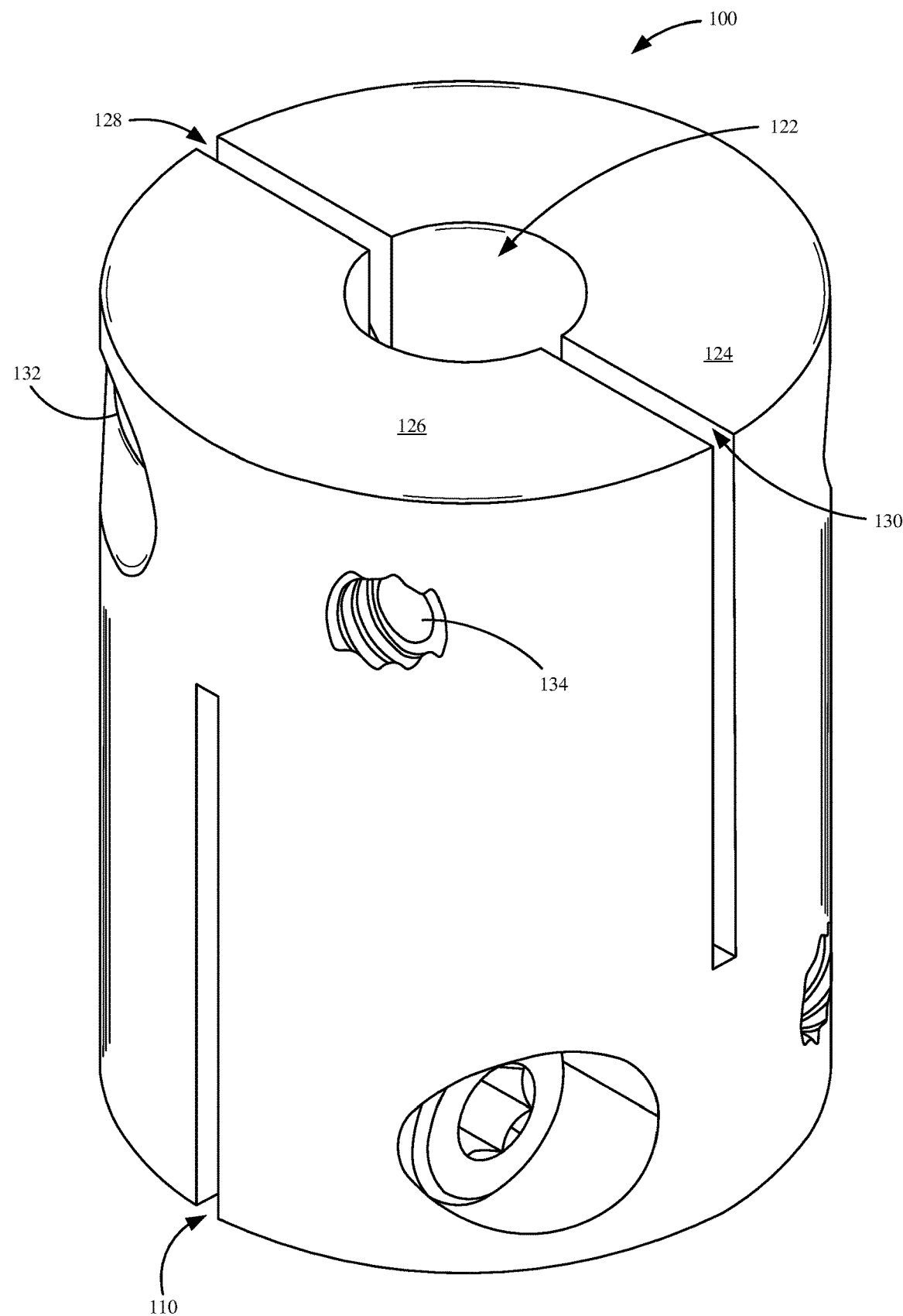
FIG. 3B is a bottom perspective view of the example coupler.

FIG. 3B is a bottom perspective view of coupler 100. As shown, coupler 100 has an accessory aperture 122 that is defined by body portion 124, body portion 126, gap 128 and gap 130. When one or more of these components shift, the cross-sectional dimensions of accessory aperture 122 changes. For example, fasteners 132 and 134 can be tightened to move body portion 124 and body portion 126 towards each other (which closes gaps 128 and 130). When body portion 124 and 126 move together they reduce the cross-sectional area of accessory aperture 122. This can be useful to secure a shaft that is inserted into accessory aperture 122. In some examples, the accessory fits snugly in accessory aperture 122, such that tightening of fasteners 132 and 134 does not change the cross-sectional area of accessory aperture 122 but rather applies a coupling force on the shaft.

As shown in FIG. 3B, the gaps on the top surface of coupler 100 (gaps 108 and 110) are perpendicularly offset from the gaps on the bottom surface of coupler 100 (gaps 128 and 130). In other examples, the top and bottom gaps may be offset at some other angle than 90 degrees. In one example, the gaps are not offset, but are separated by a portion of the body. In one example, the gaps extend all the way through the body such that the coupler body comprises two parts.

Figure 3C:
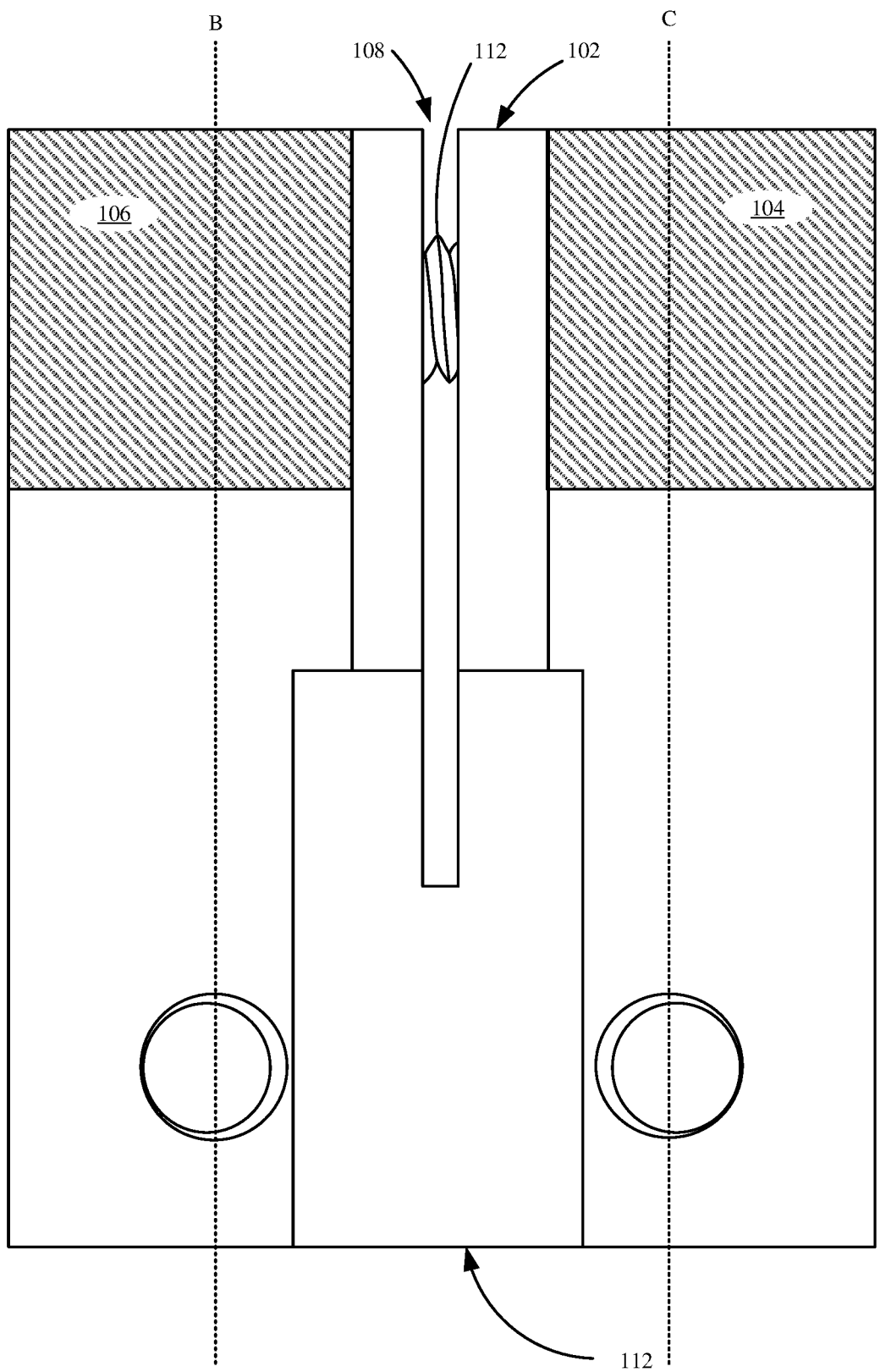
FIGS. 3C-E are sectional views of the example coupler.

FIG. 3C is a sectional view of the cross-section defined by plane A in FIG. 3A. As shown in this view, body portions 106 and 104 and gap 108 define shaft aperture 102. Gap 108 can be closed by tightening the fastener 112, which deforms body portions 104 and 106 towards one another, which in turn, will reduce the cross-sectional area of shaft aperture 102. In some cases, a shaft snugly fits within shaft aperture 102 and tightening a fastener 112 does not change the area of shaft aperture 102 but rather secures the inserted shaft to the coupler 100. As shown, shaft aperture 102 and accessory aperture 122 are part of the same aperture. In another example, shaft aperture 102 and accessory aperture 122 do not extend into one another.

Figure 3D:
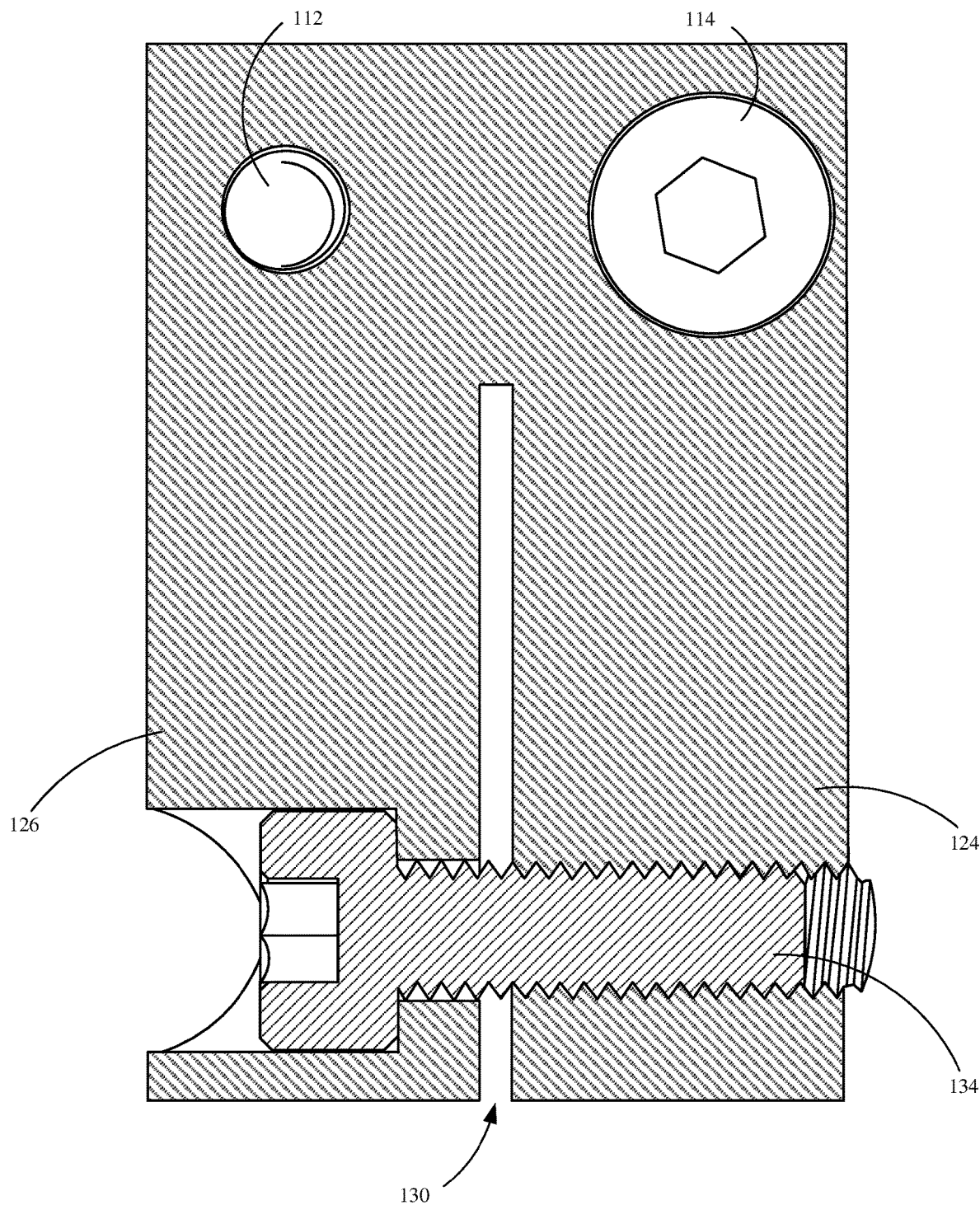

FIG. 3D is a sectional view of the cross-section defined by plane B in FIG. 3C. As shown, faster 134 couples body portion 126 to body portion 124 and tightening the fastener 134 will bring these two body portions closer together and reduce the size of gap 130. As shown in FIG. 3B, gap 130 defines a portion of accessory aperture 122. Such that when gap 130 closes the cross-sectional area of accessory aperture 122 is reduced. In some cases, an accessory may fit snugly within accessory aperture 122 and rather than reducing the cross-sectional area of accessory aperture 122, tightening a fastener 134 or reducing gap 130 will couple the accessory to coupler 100 (e.g., by increasing a friction force on the shaft). Also shown in FIG. 3D are fasteners 112 and 114 which can be actuated to tighten shaft aperture 102.

Figure 3E:
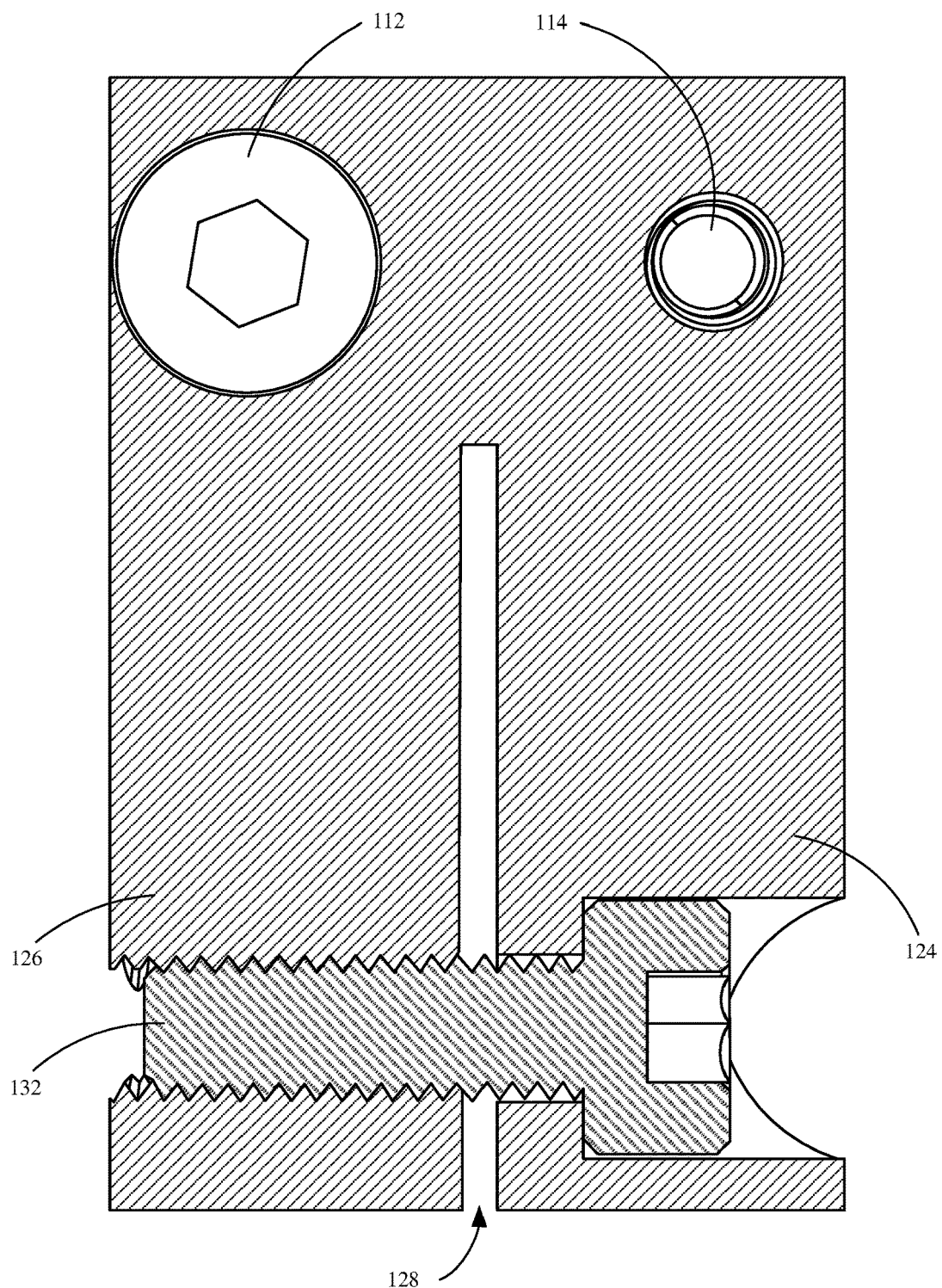

FIG. 3E is a sectional view of a cross-section defined by plane C in FIG. 3C. As shown, body portions 124 and 126 are coupled together by fastener 132. Tightening fastener 132 can actuate body portion (e.g., deform, etc.) 124 and body portion 126 together, closing gap 128. As gap 128 closes and body portions 124 and 126 move, they reduce the cross-sectional area of accessory aperture 122. Accessory aperture 122 can receive a portion of an accessory and when the fasteners 132 and 134 tightens, the accessory is coupled to coupler 100.

Figure 4A:
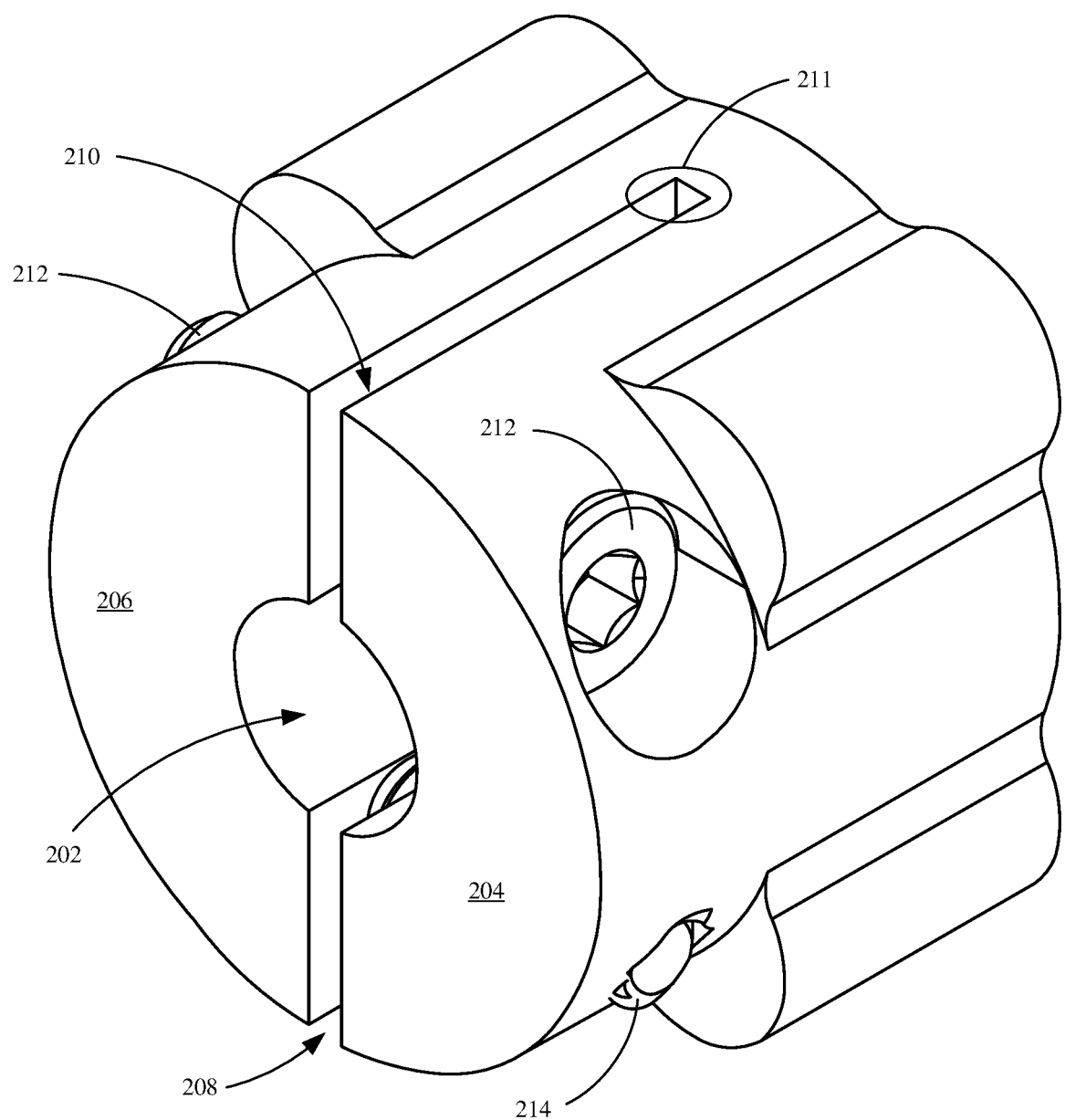
FIG. 4a is a rear perspective view showing an example coupler.

FIG. 4A is a rear perspective view showing one example of an accessory coupler 200. As shown, coupler 200 includes a shaft aperture 202 that is defined by body portion 204, body portion 206, gap 208, and gap 210. When one or more these components are shifted or moved in some way, the shaft aperture 202 is reduced or increased in size. In some cases, a shaft inserted into shaft aperture 202 snugly fits and tightening of fasteners 212 and/or 214 increases a friction force applied on the received shaft, such that the shaft is coupled to coupler 200. Actuating fasteners 212 and/or 214 in a tightening manner will bring body portion 204 in closer contact to body portion 206 which would reduce the size of shaft aperture 202 and gaps 208 and 210. When body portion 204 and 206 deform they pivot from an area indicated by reference number 211. By pivoting at this point the deformation of body portions 204 and 206 have a minimal effect on the spacing of attachment apertures 218 (shown in FIG. 4B) on the face of coupler 200.

Figure 4B:
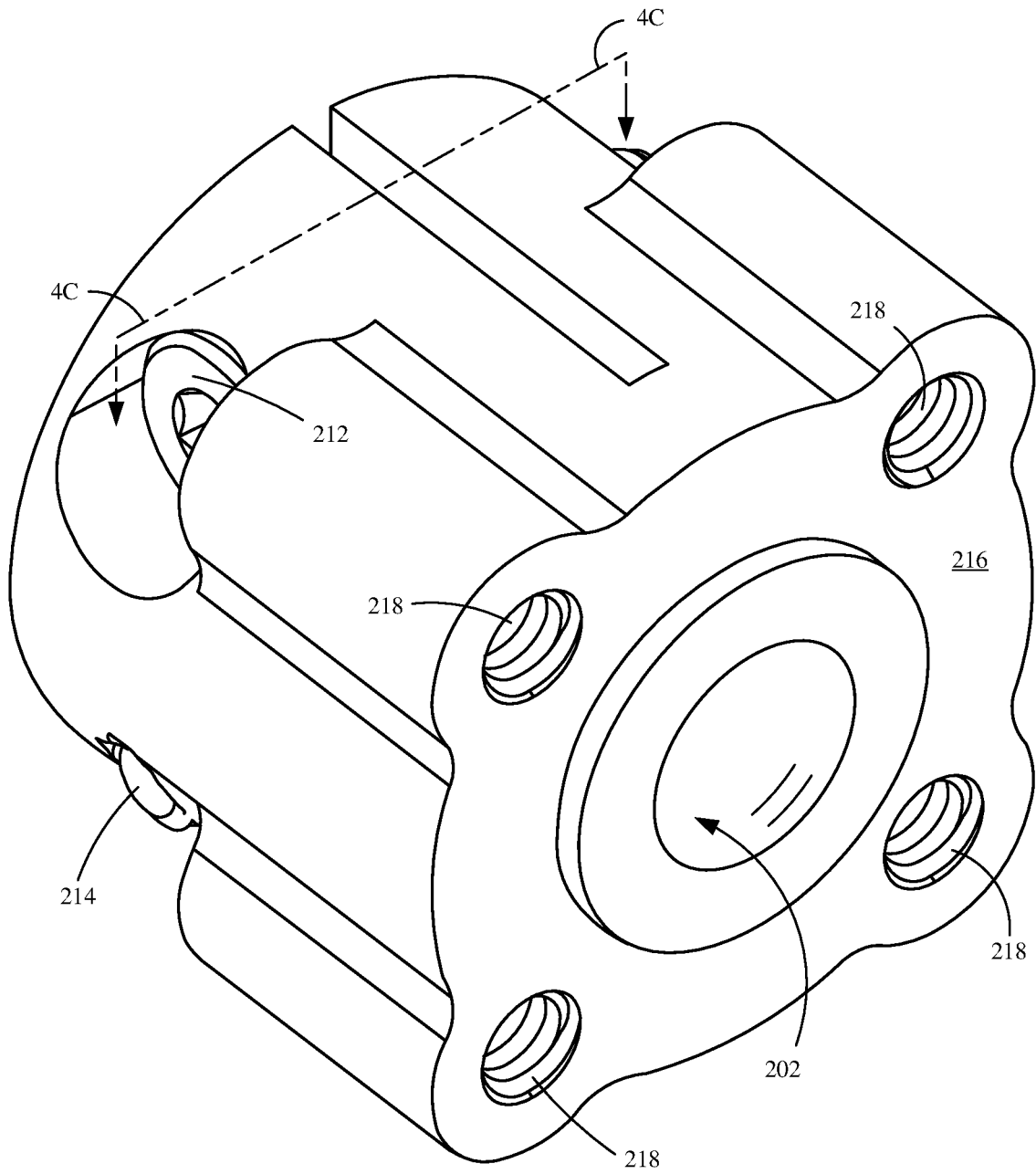
FIG. 4B is a front perspective view of the example coupler.

FIG. 4B is a front perspective view showing an example coupler. coupler 200 includes alignment feature 216 and attachment apertures 218. An accessory can be coupled to coupler 200 using attachment apertures 218. The accessory can be aligned on the coupler with the assistance of alignment feature 216. As shown, there are four attachment apertures 218. In another example, coupler 200 includes a different number of attachment apertures 218. Attachment apertures 218 receive fasteners that secure an accessory (not shown). As shown attachment apertures 218 are threaded apertures that receive a threaded fastener. In another example, attachment apertures 218 can be clearance holes that accept different fastener assemblies (e.g., a bolt that couples to a nut).

In the shown example, these attachment apertures 218 are through hole apertures. In another example, attachment apertures 218 are blind hole apertures and do not extend fully through the coupler. The spacing between attachment apertures 218 may correspond to an accessory that is to be attached to coupler 100. In one example, attachment apertures 218 are substantially in a 1.5"×1.5" from center square orientation. In one example, attachment apertures 218 are substantially in a 0.544"×0.544" (0.770" diagonal) from center square orientation. Another example, attachment apertures 218 are substantially in a 16 mm by 16 mm square pattern. In one example, attachment apertures 218 are 6-32 threaded apertures. In another example, attachment apertures 218 are M4 threaded apertures.

Alignment feature 216, as shown, extrudes outward from coupler 200 on only one side. In another example, alignment feature 216 extrudes outward from coupler 200 on both sides. Alignment feature 216 can increase the surface area between shaft and shaft aperture 102. Alignment extrusion 120 can also align an accessory mounted to coupler 200. In one example, alignment feature 216 extrudes substantially 0.1" away from coupler 200. In another example, alignment feature 216 is an indentation rather than an extrusion.

Figure 4C:
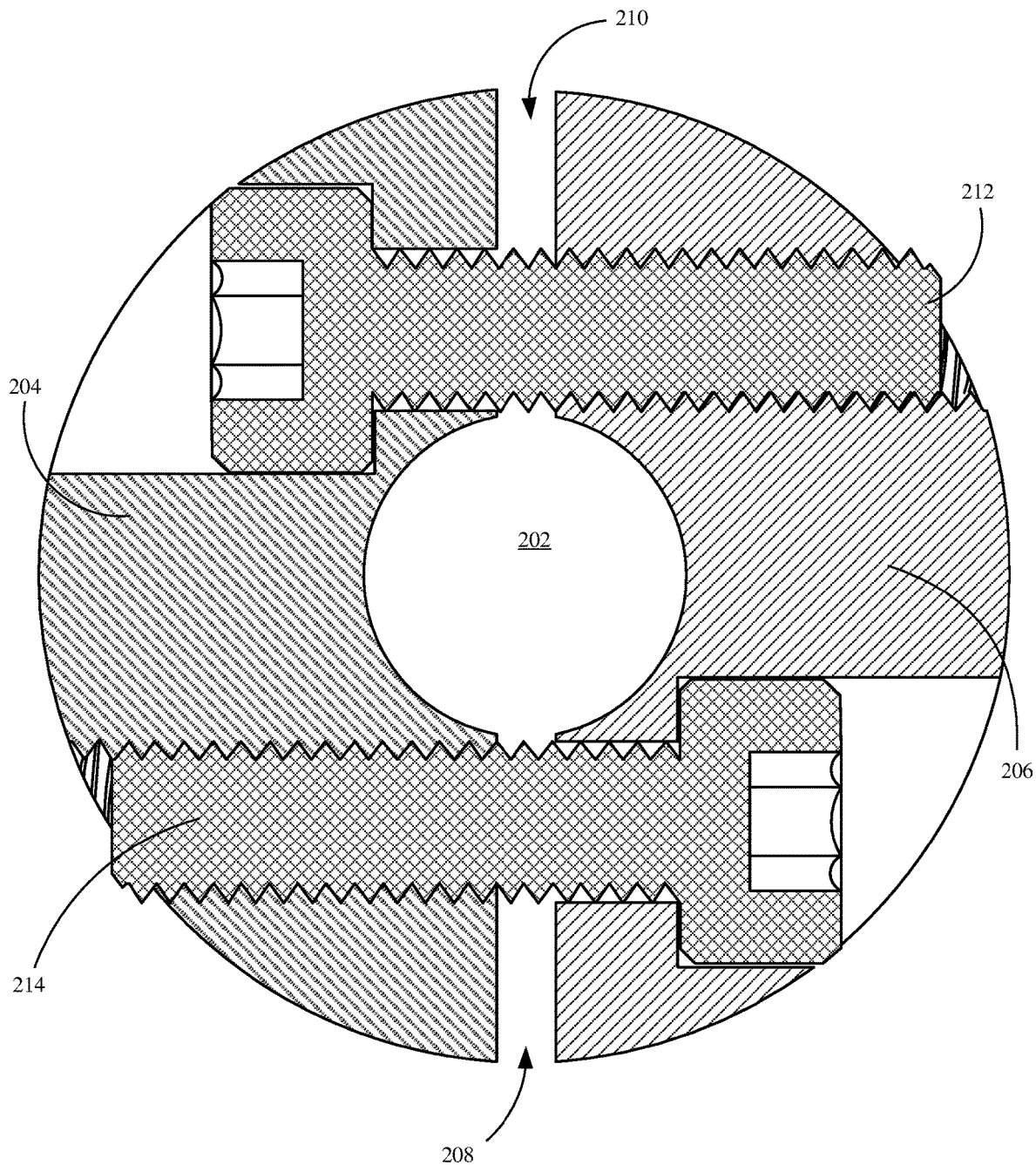
FIG. 4C is a sectional view of the example coupler.

FIG. 4C is a sectional view defined by the cross-section defined in FIG. 4B. As shown, aperture 202 extends fully through the coupler body. In another example after 202 does not extend fully through the coupler body. As shown, the shaft aperture 202 is defined by body portion 204, body portion 206, gap 208 and gap 210. Tightening fastener 212 closes gap 210 by bringing body portion 206 towards body portion 204. Tightening fastener 214 closes gap 208 by moving body portion 204 towards body portion 206. Fasteners 212 and 214, as shown, are hex cap screws. In other examples, fasteners 212 and 214 can be different fasteners. Fasteners 212 and 214 are shown disposed within recesses of the coupler body. However, in other examples, fasteners 212 and 214 may be disposed on the exterior of coupler 200.

Figure 5A:
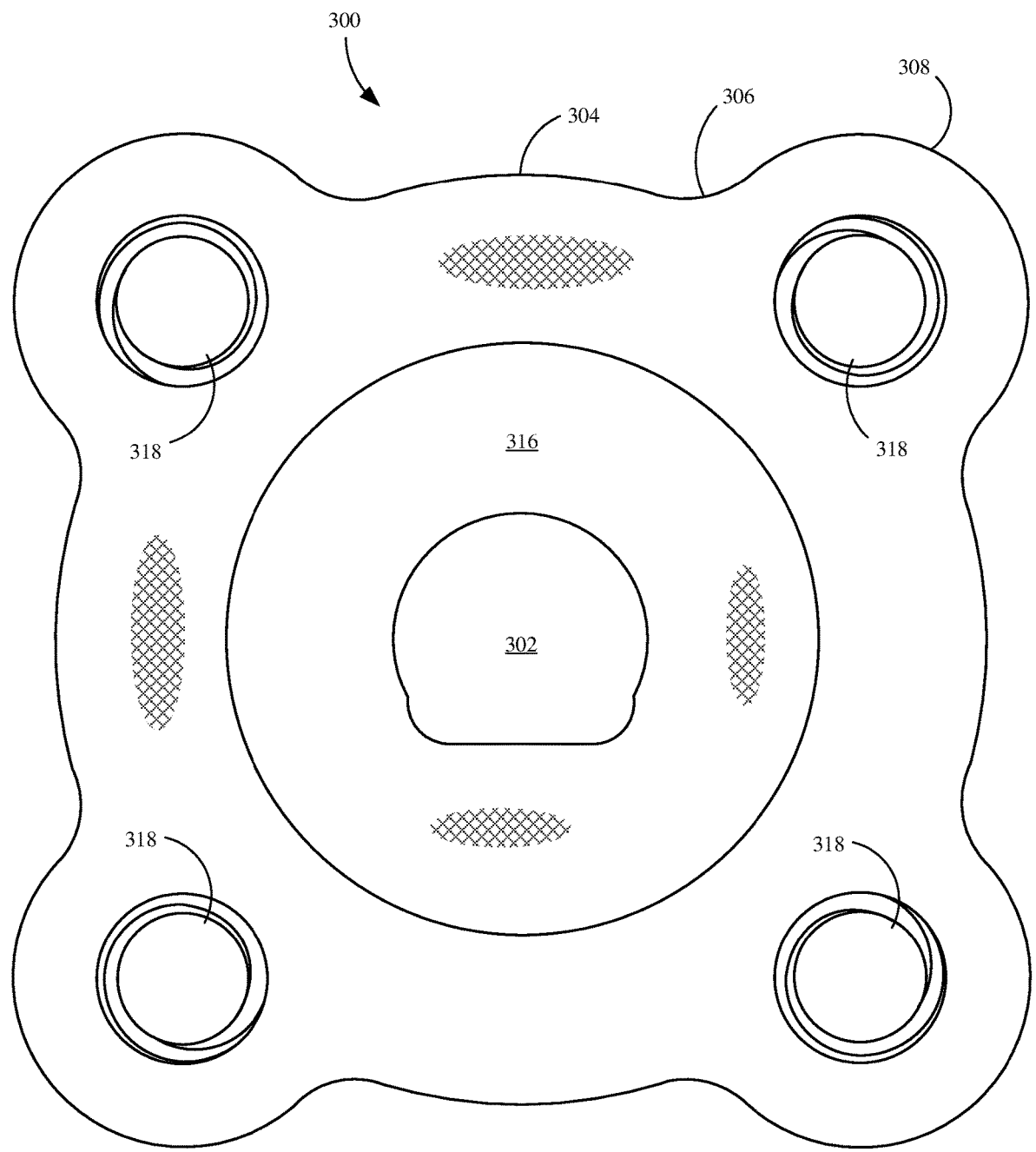
FIG. 5a is a top plan view showing an example coupler.

FIG. 5A a is a top plan view showing one example of a coupler profile. Coupler 300 includes an aperture 302. As shown aperture 302 is a D shaped shaft coupler. In other examples, aperture 302 can be shaped in other shapes as well. For example, aperture 302 can be hexagonal, circular, spline shaped, etc.

Also shown is accessory alignment feature 316. As shown accessory alignment features 316 is a circular extrusion extending away from the face of coupler 300. In another example, the alignment feature 316 can be shaped differently. For example, alignment features 316 can be spline shaped, D shaped, etc. In one example, the shape may be useful in only allowing an accessory to attach in one particular orientation. For example, a keyed feature on the accessory aligns with a keying feature of accessory alignment feature 316 such that the accessory can only mount in one orientation.

As shown, exterior features 304, 306 and 308 defined the outer profile of coupler 300. Exterior feature 304 is an archway shape that provides additional strength to a portion of the exterior body. Exterior feature 306 is an indentation between exterior features 304 and 308. Exterior feature 306 can reduce the overall weight of coupler 300. This is particularly advantageous in rotational operations to reduce the moment of inertia of coupler 300. Exterior feature 308 is a protruding feature from the main body of coupler 300. Exterior feature 308 provides strength for accessory apertures 310. Spacing accessory apertures 310 further away from the aperture 302 provided better leverage on attached accessory (e.g., as the apertures are a given distance away from aperture 302 upon which the accessory will rotate about).

Figure 5B:
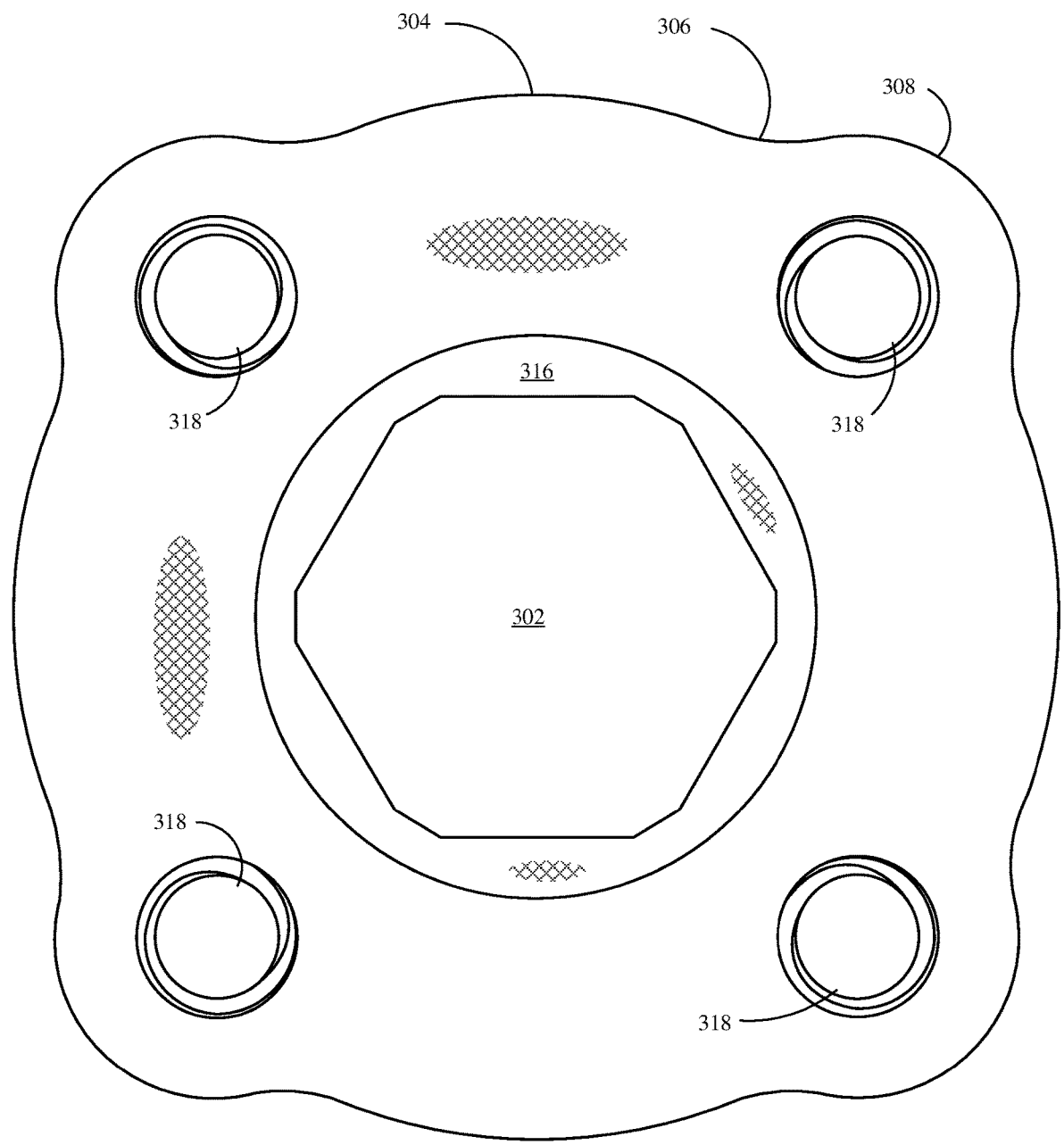
FIG. 5B is a top plan view showing an example coupler.

FIG. 5B is a top plan view showing an example coupler profile. As shown aperture 302 is a hexagonal shape. However, in other examples aperture 302 can be a different shape as well, such as those listed above with respect to FIG. 5A.

Figure 6A:
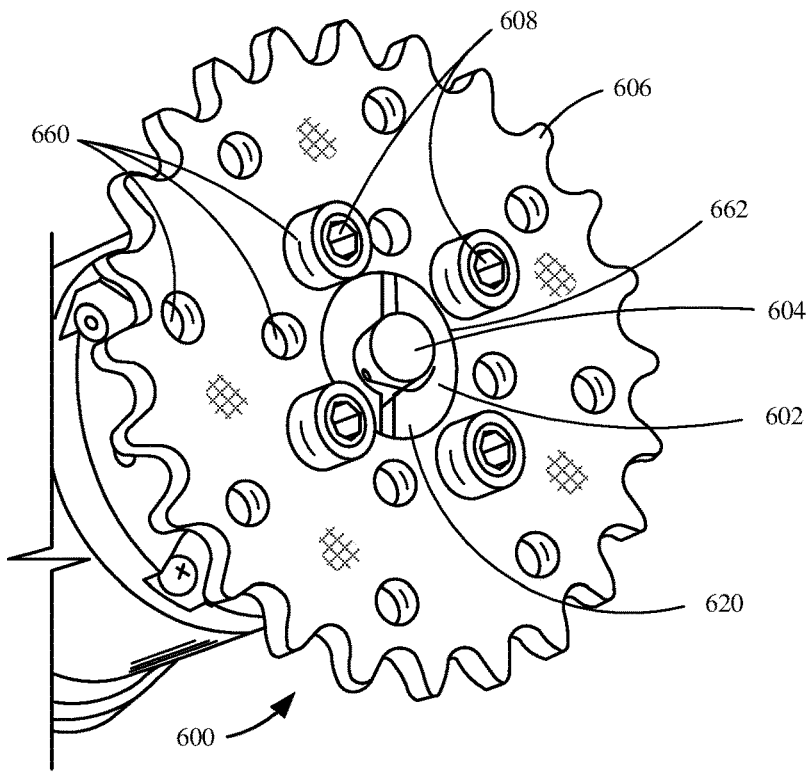
FIG. 6A is a front view showing a motor, coupler and accessory assembly.

FIG. 6A is a front view showing one example of an attachment assembly. Assembly 600 includes coupler 602, shaft 604, accessory 606, and fasteners 608. Coupler 602 is secured onto shaft 604. As shown, accessory 606 is a sprocket. However, other suitable accessories are also possible, including, but not limited to, those shown in FIGS. 6A-F. Accessory 606 is secured to coupler 602 by fasteners 608. As shown, fasteners 608 are socket cap screws. In another example, fasteners 608 could be another type of fastener, for example, but not limited to, rivets, machine screws, bolts, nuts, weld, etc. Fasteners 608, as show are inserted through mounting apertures 660 of the accessory 606. As shown, there are four fasteners 608, however, in other examples there may be a different number of fasteners 608. As shown, there are plurality of mounting apertures 660 where coupler 402 can be secured. In another example, there is only one set of mounting apertures 660 corresponding to the apertures on the coupler. Accessory 606, in one example, is centered on coupler 602 by aligning aperture 662 of accessory 606 contacting aligning extrusion 620 of coupler 602. As shown, aligning aperture 662 and aligning extrusion 620 have a circular cross-section, however, the cross-section may be a different non-circular shape. For example, aligning aperture 662 and aligning extrusion 620 may have corresponding features that orient the accessory in a specific orientation.

Figure 6B:
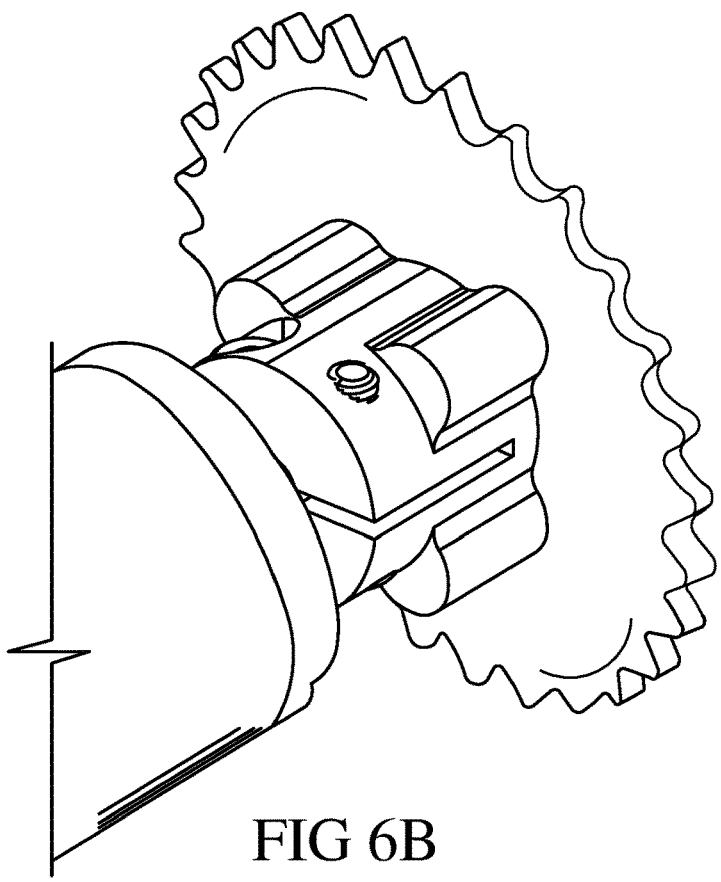
FIG. 6B is a rear view showing one example attachment assembly.

FIG. 6B illustrates a rear view of one example of an attachment assembly. Coupler 602 and accessory 606 are coupled together by fasteners 608 being threaded into apertures of accessory receiver 610. In other examples, coupler 602 and accessory 606 are coupled together in a different way. Coupler 602 is coupled to shaft 604 through clamp 614 and fastener 612.

Figure 6C:
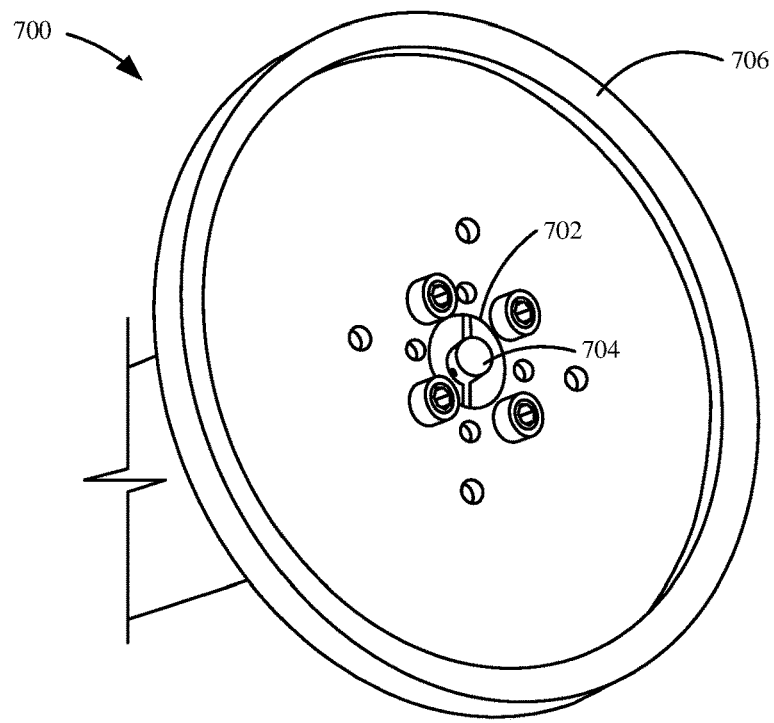
FIGS. 6C and 6D are views showing one example attachment assembly.
Figure 6D:
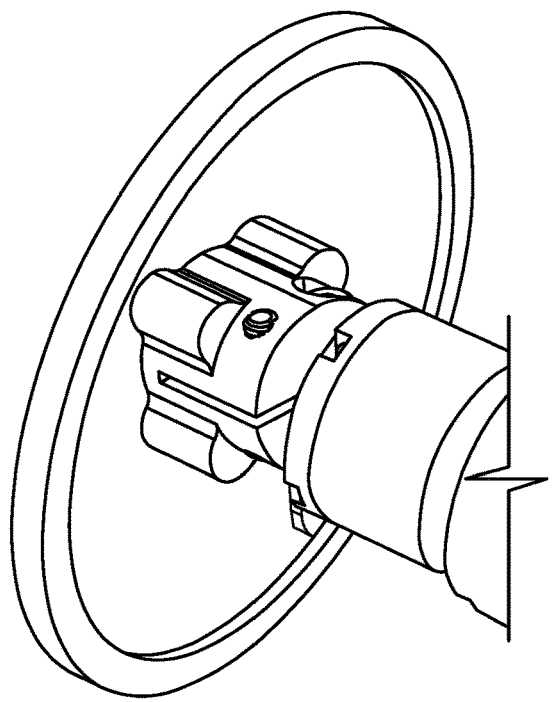

FIGS. 6C and 6D are views of one example of an attachment assembly, in accordance with embodiments of the present invention. Coupler assemblies 700 and 750 include coupler 702, accessory 706 and shaft 704. As shown, accessory 706 is a wheel and, in one example, couples similarly to accessory 606 and coupler 602.

Figure 6E:
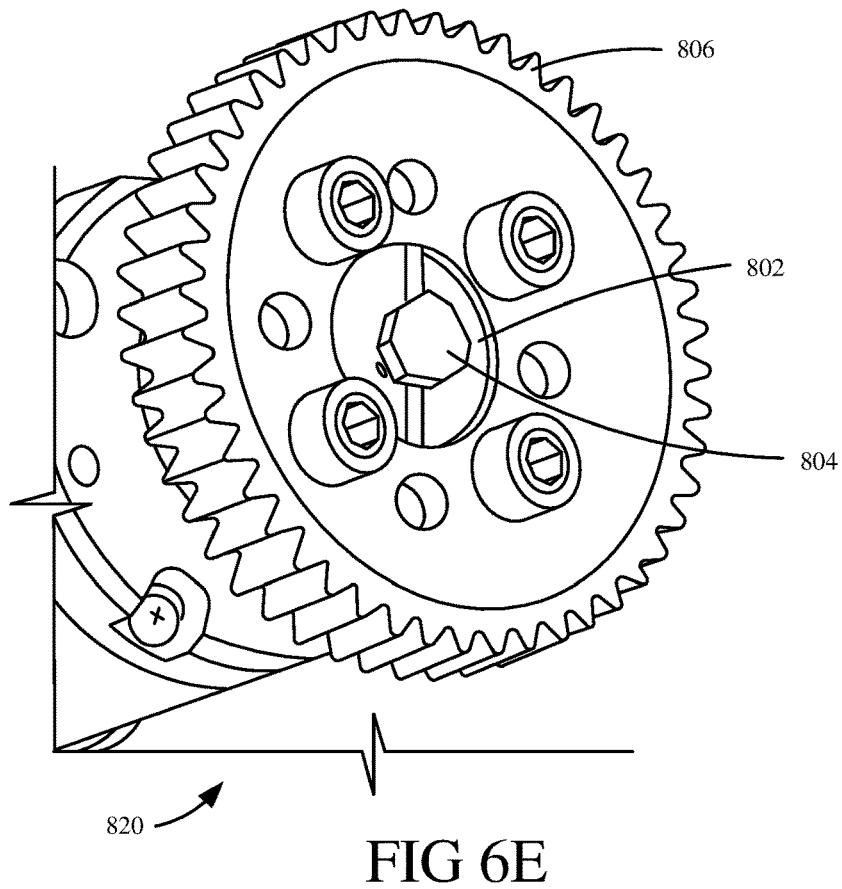
FIGS. 6E and 6F are views showing one example attachment assembly.
Figure 6F:
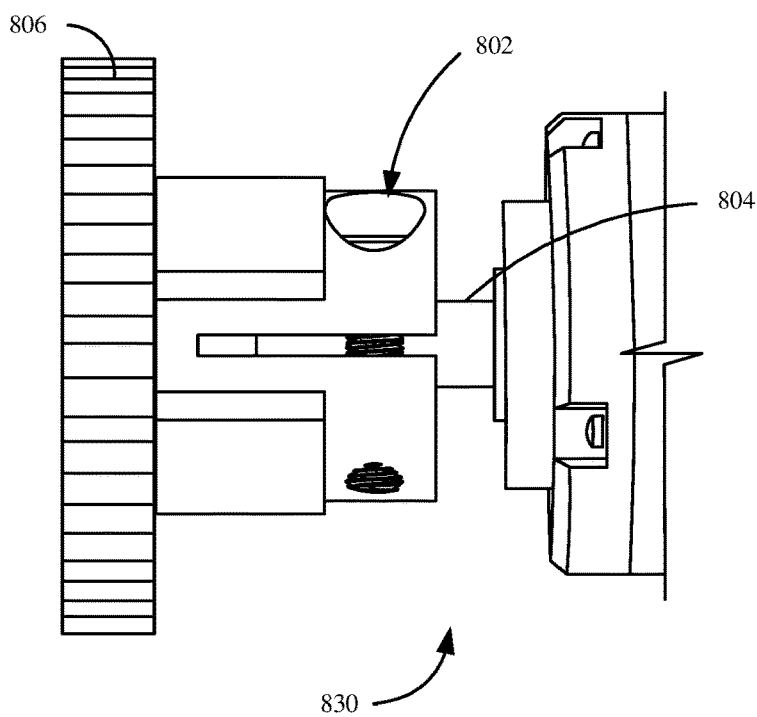

FIGS. 6E and 6F are views of one example of an attachment assembly, in accordance with embodiments of the present invention. Coupler assemblies 820 and 830 comprise coupler 802, accessory 806 and shaft 804. As shown, accessory 806 is a gear and, in one example, couples similarly to accessory 606 and coupler 602.

Figure 7:
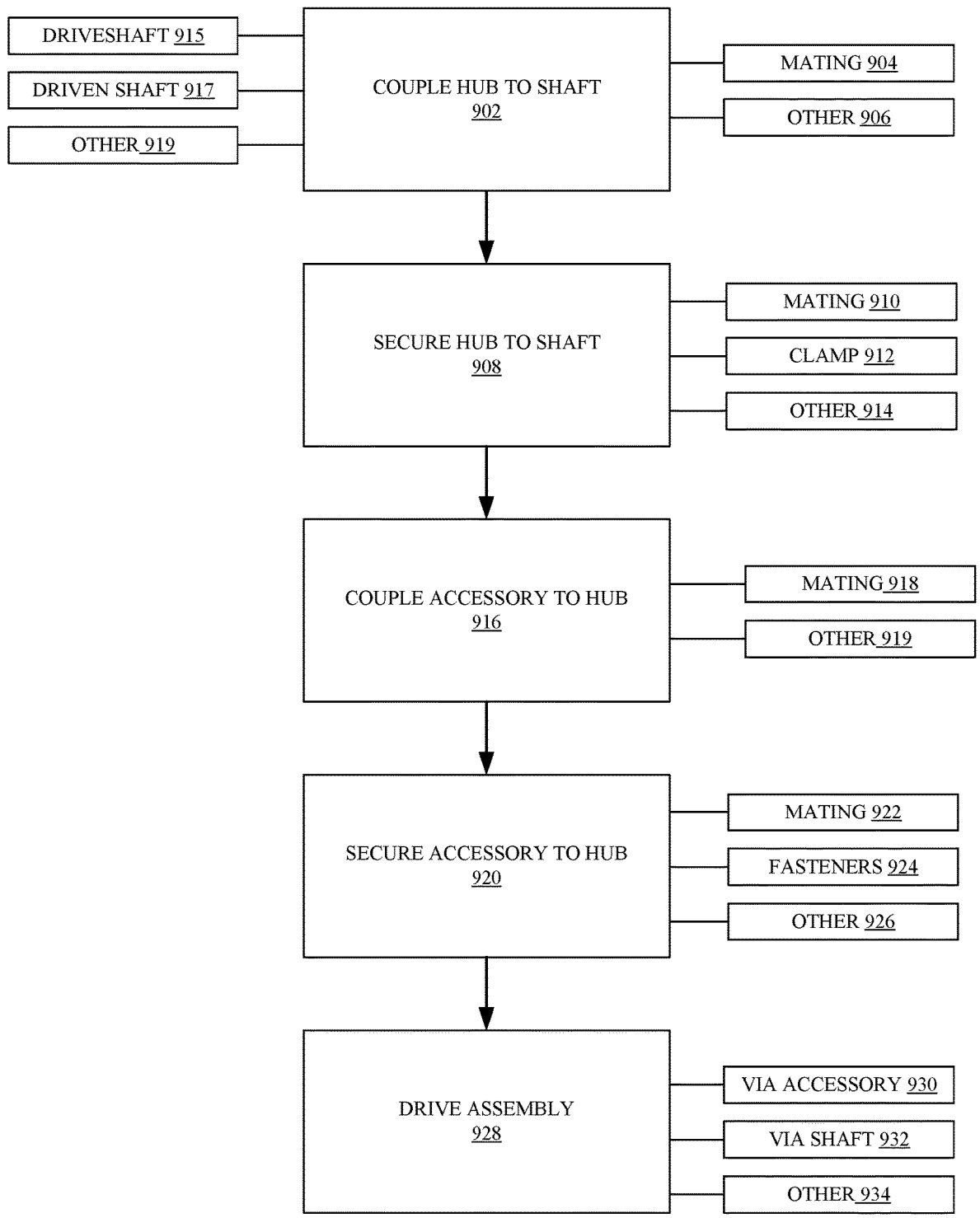
FIG. 7 is a flow diagram showing one example operation a coupler.

FIG. 7 is a flow diagram showing one example operation of one or more of the couplers as described above. At block 902, the coupler is coupled onto a shaft. The shaft can be a driveshaft as indicated by block 915. For example, the output shaft of a hobby servo motor or the output shaft of a stepper motor. The shaft can be a driven shaft as indicated by block 917. For example, a shaft supported by ball bearings or bushings. The shaft can be a different type of shaft as well, as indicated by block 919.

The coupler may comprise features that correspond and mate with features on the shaft, as indicated by block 904. An example of a mated feature may include a flat (d-shaft), splines or protruding features (teethed shaft) on the shaft. The coupler may also fit on the shaft in other ways as well as indicated by 906. For example, the coupler may loosely or otherwise fit on the shaft.

At block 908, the coupler is secured onto the shaft. Securing the coupler may involve mating of features of the coupler and shaft, as indicated by block 910. For example, internal splines of a shaft aperture of the coupler can mate with splines of the shaft. Securing the coupler may involve a clamp force, as indicated by block 912. A clamp force can be applied through one or more threaded connections as described above. For example, in FIG. 3 the threaded connection between first fastener 132 and threaded aperture 142 of first deformable feature 116. A clamp force may also be applied through a locking lever mechanism. Securing the coupler may also involve other mechanisms, as indicated by block 914.

At block 916, an accessory is coupled to the coupler. The accessory can have a feature that mates with the coupler, as indicated by block 918. For example, the accessory has a hexagonal aperture that corresponds and mates with a hexagonal extrusion of the coupler. As another example, the accessory may have a non-symmetrical aperture that corresponds with an extrusion of the coupler. A non-symmetrical shape would ensure that the accessory was coupled to the coupler in a specific orientation. The accessory may also fit loosely or otherwise on the coupler, as indicated by block 919.

At block 920, the accessory is secured to the coupler. Securing the accessory may involve mating of features on the accessory and coupler, as indicated by block 922. For example, alignment of features on the accessory (aperture, extrusion, etc.) with features of the coupler (aperture, extrusion, etc.). Securing the accessory may involve tightening of fasteners, as indicated by block 924. For example, some examples of fasteners are socket cap screws, machine screws, bolts, rivets, pins, etc. Securing the accessory may involve other mechanisms as well, as indicated by block 926.

At block 928, the assembly is driven. The assembly may be driven via the accessory as indicated by block 930. For example, the assembly can be driven via the accessory when the shaft is not a drive shaft and the accessory is a gear/pulley/sprocket/etc. driven by motor. The assembly may be driven via the shaft, as indicated by block 932. For example, the shaft is a shaft of a servo motor. Driving the assembly can also be completed via other means as well, as indicated by block 934.

Examples of the present invention provide many improvements and features not currently in use. One of these features includes the clamp gap locations. Another new feature is the aperture 0.770" diagonal and 16 mm×16 mm patterns. Another new feature is the sizing of the apertures to mate with or be threaded to match standard components. Another new feature is the symmetry of the shaft securing fasteners for a reduced wobble in high speed rotation applications. Another new feature is the center of mass of the coupler is substantially on the center of rotation for a reduced wobble in high speed rotation applications. Another new feature is that the deformable components of the coupler can provide a clamping force on a shaft without deforming the apertures that receive an accessory. Additionally, there are other new features disclosed herein not found in any past disclosures.

Although the present invention has been described with reference to preferred embodiments, workers skilled in the art will recognize that changes may be made in form and detail without departing from the spirit and scope of the invention.

What is claimed is:

1. An accessory coupling system for a hobby motor, the accessory coupling system comprising:
    a body having a first end and a second end, the first end having a motor shaft aperture disposed therein, the motor shaft aperture being cylindrical and adapted to receive an output shaft of the hobby motor, the body also having a gap extending across the first end and intersecting a center of the motor shaft aperture, wherein the second end of the body is configured to couple to the accessory via a plurality of accessory mounting apertures, and wherein the accessory mounting apertures have a longitudinal axis extending parallel to a longitudinal axis of the body;
    a first fastener aperture defined in the body and configured to threadably receive a first fastener, wherein the first fastener aperture extends across the gap;
    a second fastener aperture defined in the body and configured to threadably receive a second fastener, wherein the second fastener aperture extends across the gap; and
    wherein the first and second fastener apertures are disposed on opposite sides of the motor shaft aperture and are configured to deform the first end of the body to clamp to the output shaft of the hobby motor via the first and second fasteners.

2. The accessory coupling system of claim 1, wherein the body is rotationally balanced about the motor shaft aperture.

3. The accessory coupling system of claim 1, wherein a spacing of the accessory mounting apertures is substantially a 0.544 inch by 0.544 inch square.

4. The accessory coupling system of claim 1, and further comprising an accessory coupled to the second end via the accessory mounting apertures, wherein the accessory is selected from a group consisting of: a second shaft, a wheel, a gear, a sprocket, a bracket, and an arm.

5. The accessory coupling system of claim 4, wherein coupling the accessory includes an accessory feature mated with an alignment feature disposed on the second end of the body, wherein mating of the accessory feature and the alignment feature ensures a single mated orientation of the accessory and the body.

6. An accessory coupling system for a hobby motor, the accessory coupling system comprising:
    a body having a first end and a second end, the first end having a motor shaft aperture disposed therein, the motor shaft aperture being cylindrical and adapted to receive an output shaft of the hobby motor, the body also having a gap extending across the first end and intersecting a center of the motor shaft aperture, wherein the second end of the body is configured to couple to the accessory via a plurality of accessory mounting apertures; a first fastener aperture defined in the body and configured to threadably receive a first fastener, wherein the first fastener aperture extends across the gap;
    a second fastener aperture defined in the body and configured to threadably receive a second fastener, wherein the second fastener aperture extends across the gap;
    wherein the first and second fastener apertures are disposed on opposite sides of the motor shaft aperture and are configured to deform the first end of the body to clamp to the output shaft of the hobby motor via the first and second fasteners; and
    wherein the plurality of accessory mounting apertures have a longitudinal access that extends perpendicular to a longitudinal axis of the first and second fastener apertures.

7. The accessory coupling system of claim 6, wherein the body is rotationally balanced about the motor shaft aperture.

8. The accessory coupling system of claim 6, wherein a spacing of the accessory mounting apertures is substantially a 0.544 inch by 0.544 inch square.

9. The accessory coupling system of claim 6, and further comprising an accessory coupled to the second end via the accessory mounting apertures, wherein the accessory is selected from a group consisting of: a second shaft, a wheel, a gear, a sprocket, a bracket, and an arm.

10. The accessory coupling system of claim 9, wherein coupling the accessory includes an accessory feature mated with an alignment feature disposed on the second end of the body, wherein mating of the accessory feature and the alignment feature ensures a single mated orientation of the accessory and the body.

11. An accessory coupling system for a hobby motor, the accessory coupling system comprising:
    a body having a first end and a second end, the first end having a motor shaft aperture disposed therein, the motor shaft aperture being cylindrical and adapted to receive an output shaft of the hobby motor, the body also having a gap extending across the first end and intersecting a center of the motor shaft aperture, wherein the second end of the body is configured to couple to the accessory via a plurality of accessory mounting apertures; a first fastener aperture defined in the body and configured to threadably receive a first fastener, wherein the first fastener aperture extends across the gap;

a second fastener aperture defined in the body and configured to threadably receive a second fastener, wherein the second fastener aperture extends across the gap;

wherein the first and second fastener apertures are disposed on opposite sides of the motor shaft aperture and are configured to deform the first end of the body to clamp to the output shaft of the hobby motor via the first and second fasteners; and wherein the plurality of accessory mounting apertures have a longitudinal access that extends perpendicular to a longitudinal axis of the motor shaft aperture.

12. The accessory coupling system of claim 11, wherein the body is rotationally balanced about the motor shaft aperture.

13. The accessory coupling system of claim 11, wherein a spacing of the accessory mounting apertures is substantially a 0.544 inch by 0.544 inch square.

14. The accessory coupling system of claim 11, and further comprising an accessory coupled to the second end via the accessory mounting apertures, wherein the accessory is selected from a group consisting of: a second shaft, a wheel, a gear, a sprocket, a bracket, and an arm.

15. The accessory coupling system of claim 14, wherein coupling the accessory includes an accessory feature mated with an alignment feature disposed on the second end of the body, wherein mating of the accessory feature and the alignment feature ensures a single mated orientation of the accessory and the body.

\* \* \* \* \*